United States Patent
Tian (10) Patent No.: US 11,262,968 B2
(45) Date of Patent: Mar. 1, 2022

(54) METHOD AND SYSTEM FOR WIRELESS SCREEN TRANSMISSION (71) Applicants: Guangzhou Shiyuan Electronics Co., Ltd., Guangzhou (CN); Guangzhou Shirui Electronics Co. Ltd., Guangzhou (CN)

(72) Inventor: Nan Tian, Guangzhou (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

(*) Notice: Subject to any disclaimer, the term of this patent is extended or adjusted under 35 U.S.C. 154(b) by 162 days.

(21) Appl. No.: 16/319,757

(22) PCT Filed: Sep. 27, 2017

(86) PCT No.: PCT/CN2017/103781
§ 371 (c)(1),
(2) Date: Jan. 22, 2019

(87) PCT Pub. No.: WO2018/209871
PCT Pub. Date: Nov. 22, 2018

(65) Prior Publication Data
US 2021/0286580 A1    Sep. 16, 2021

(30) Foreign Application Priority Data
May 19, 2017   (CN) .......................... 201710359589.8

(51) Int. Cl.
*G06F 3/023* (2006.01)
*G06F 3/0488* (2013.01)
(Continued)

(52) U.S. Cl.
CPC ............ *G06F 3/1454* (2013.01); *G06F 3/023* (2013.01); *G06F 3/0488* (2013.01); *G06F 3/04886* (2013.01)

(58) Field of Classification Search
CPC .... G06F 3/1454; G06F 3/1446; G06F 3/1431; G06F 3/167; G06F 3/0482; G06F 3/0488;
(Continued)

(56) References Cited

U.S. PATENT DOCUMENTS 10,708,534 B2 * 7/2020 Park ................. H04N 21/42204
2014/0149927 A1   5/2014 Yoon
(Continued)

FOREIGN PATENT DOCUMENTS

CN   102572578 A   7/2012
CN   105262974 A   1/2016
(Continued)

OTHER PUBLICATIONS

International Search Report for PCT/CN2017/103781, dated Jan. 29, 2018, 5 pages.

*Primary Examiner* — Vijay Shankar
(74) *Attorney, Agent, or Firm* — Zhong Law, LLC (57) ABSTRACT

The present disclosure includes a method and a system for wireless screen transmission, the method includes: receiving first feedback information transmitted from each computer among multiple computers when the each computer detects that itself is in a first display state, where the first display state refers to that the each computer detects a change in the desktop image within a first preset time period, where all of the multiple computers simultaneously perform wireless screen transmission with a receiving terminal, and the desktop image of the each computer is respectively displayed on a corresponding split screen of the receiving terminal; and displaying, when it is determined according to the first
(Continued)

feedback information that only one computer of the multiple computers is in the first display state, a split screen corresponding to the one computer in the first display state in full-screen. The present disclosure enables the display of a certain split screen among multi-split screens in full-screen conveniently, thus improving interaction experience.

10 Claims, 4 Drawing Sheets

(51) Int. Cl.
*G06F 3/14* (2006.01)
*G06F 3/04886* (2022.01)

(58) Field of Classification Search
CPC .. G06F 3/04883; G06F 3/04886; G06F 3/023; G06F 9/452; G09G 2360/04; G09G 2356/00; G09G 2300/026; G09G 5/399; G09G 2370/022; G09G 2370/16; G09G 2370/06; G09G 2370/025

See application file for complete search history.

(56) References Cited

U.S. PATENT DOCUMENTS

| | | | |
|---|---|---|---|
| 2016/0249006 A1 | 8/2016 | Park et al. | |
| 2020/0158761 A1* | 5/2020 | Hsu | G01R 15/207 |
| 2020/0348900 A1* | 11/2020 | Zhang | G06F 40/169 |
| 2020/0357359 A1* | 11/2020 | Mu | G06F 3/1454 |

FOREIGN PATENT DOCUMENTS

| | | |
|---|---|---|
| CN | 105892976 A | 8/2016 |
| CN | 105955685 A | 9/2016 |
| CN | 106155609 A | 11/2016 |
| CN | 106547469 A | 3/2017 |

* cited by examiner

METHOD AND SYSTEM FOR WIRELESS SCREEN TRANSMISSION

CROSS-REFERENCE TO RELATED APPLICATIONS

This application is a continuation of International Application No. PCT/CN2017/103781, filed on Sep. 27, 2017, which claims priority to Chinese Patent Application No. 201710359589.8, filed on May 19, 2017, both of which are hereby incorporated by reference in their entireties.

TECHNICAL FIELD

The present disclosure relates to the field of computer information processing technologies and in particular, to a method and a system for wireless screen transmission.

BACKGROUND

The wireless screen transmission technology mainly enables synchronous presentation of contents and sounds on a receiving end apparatus, such as a projector, a television and a flat panel-for-conference with the contents and sounds which are displayed on a screen of a source end apparatus for presentation. The technology is able to combine high processing capacity of the source end apparatus (e.g., a computer) with good-quality presentation effects of the receiving end apparatus (e.g., a television or a flat panel-for-conference), and is thus widely used.

The existing wireless screen transmission technology is mainly realized by adopting screen transition programs. Corresponding screen transition programs are installed on both of the source end apparatus and the receiving end apparatus, and with the source end apparatus and the receiving end apparatus being in the same wireless network, the wireless screen transmission of multimedia information (including pictures, audios, videos and the like) is thus realized.

The existing wireless screen transmission technology can present multiple screen contents side by side on a vast screen. For example, four participants in a conference can simultaneously project contents on respective screens of their own laptops onto a large screen, where the contents are displayed in four split screens. When details of the presented contents need to be discussed and demonstrated at the conference, the complex operations in the prior wireless screen transmission technology will affect the interaction experience.

SUMMARY

The present disclosure aims at solving at least one of the technical problems in the prior art. To this end, embodiments of the present disclosure provide a method for wireless screen transmission, which is capable of conveniently displaying, in a full-screen, a particular split screen among multi-split screens, thereby improving interaction experience.

The method for wireless screen transmission according to the embodiments of the present disclosure includes: receiving first feedback information transmitted from each computer among multiple computers when the each computer detects that itself is in a first display state, where the first display state refers to that the each computer detects a change in the desktop image within a first preset time period, where all of the multiple computers simultaneously perform wireless screen transmission with a receiving terminal, and the desktop image of the each computer is respectively displayed on a corresponding split screen of the receiving terminal; and responsive to determining that, according to the first feedback information, only one of the multiple computers is in the first display state, displaying a split screen corresponding to the one computer in the first display state in full-screen.

In the method for wireless screen transmission according to the embodiments of the present disclosure, each computer detects whether itself is in a first display state, e.g., in the case where only one computer detects itself in the first display state, demonstrating that the user currently operating this computer hopes to draw attention of other people to the contents displayed on his own computer. At this time, since this computer is in the first display state, the receiving terminal would display the split screen corresponding to this computer in full-screen, thus realizing automatic full-screen display of the split screen among multi-split screens, while avoiding complex operation and improving interaction experience.

In addition, the method for wireless screen transmission according to the above embodiments of the present disclosure may also include the following additional technical features:

further, in one embodiment of the present disclosure, the step of displaying a split screen corresponding to the one computer in the first display state in full-screen includes:

transmitting request information to the one computer in the first display state, where the request information includes a request for increasing a transmission resolution and a bit rate, and meanwhile, transmitting a request for suspending transmission of the desktop image to all the computers not in the first display state, so as to allow the one computer in the first display state to increase the transmission resolution and the bit rate in accordance with the request information, while allowing all the computers not in the first display state to suspend the transmission of their desktop images.

Further, in one embodiment of the present disclosure, the first feedback information is a message generated when the computer within the first preset time period detects a switch of a front-most desktop window in a collection of windows or a change in a window layout; where the collection of windows refers to all windows whose sizes are larger than one third of the desktop and which are acquired by the computer after the computer enumerates desktop windows on the desktop through an API in an operating system.

Further, in one embodiment of the present disclosure, the method also includes:

receiving second feedback information transmitted from the each computer when the each computer detects that itself is in a second display state, where the second display state refers to that the each computer detects keyboard-inputted information and/or mouse movement information within a second preset time period; and responsive to determining that, according to the second feedback information, only one computer is in the second display state, displaying a split screen corresponding to the one computer in the second display state in full-screen.

Further, in one embodiment of the present disclosure, the method also includes:

keeping displaying the desktop images of all the computers on the split screens when none or at least two of the computers are determined to be in the first display state in accordance with the first feedback information.

An embodiment of the present disclosure also provides a method for wireless screen transmission, which is capable of conveniently displaying a certain split screen among multi-split screens in full-screen, thereby improving interaction experience.

The method for wireless screen transmission in accordance with the embodiments of the present disclosure includes:

detecting whether a computer itself is in a first display state, and transmitting a detection result to a receiving terminal, where the first display state refers to that a change in the desktop image is detected within a first preset time period, where the receiving terminal performs wireless screen transmission simultaneously with multiple computers, and the desktop image of the each computer is respectively displayed on a corresponding split screen of the receiving terminal; and transmitting first feedback information to the receiving terminal when detecting that the computer itself is in the first display state, so that the receiving terminal displays, responsive to determining that, according to the first feedback information, only one computer of the multiple computers is in the first display state, displaying a split screen corresponding to the one computer in the first display state in full-screen.

In addition, the method for wireless screen transmission in accordance with the above embodiments of the present disclosure may also have the following additional technical features:

further, in one embodiment of the present disclosure, when detecting itself in the first display state, after the step of transmitting the first feedback information to the receiving terminal, the method includes:

receiving request information transmitted from the receiving terminal, wherein the request information comprises a request for increasing a transmission resolution and a bit rate, and meanwhile, receiving a request for suspending transmission of the desktop image transmitted by the receiving terminal, so as to allow the one computer in the first display state to increase the transmission resolution and the bit rate in accordance with the request information, while allowing all the computers not in the first display state to suspend the transmission of their desktop images.

An embodiment of the present disclosure also provides a system for wireless screen transmission, which is capable of conveniently displaying a certain split screen among multi-split screens in full-screen, thereby improving interaction experience.

The system for wireless screen transmission in accordance with in the embodiment of the present disclosure includes:

a receiving module, to receive first feedback information transmitted from each computer among multiple computers when the each computer detects that itself is in a first display state, where the first display state refers to that the each computer detects a change in the desktop image within a first preset time period, where all of the multiple computers simultaneously perform wireless screen transmission with a receiving terminal, and the desktop image of the each computer is respectively displayed on a corresponding split screen of the receiving terminal; and a processing module, responsive to determining that, according to the first feedback information, only one computer of the multiple computers is in the first display state, to display a split screen corresponding to the one computer in the first display state in full-screen.

In addition, the system for wireless screen transmission in accordance with the above embodiment of the present disclosure may also have the following additional technical features:

further, in one embodiment of the present disclosure, the processing module includes:

a transmitting unit, to transmit request information to the computer in the first display state, where the request information includes a request for increasing a transmission resolution and a bit rate, and meanwhile, transmit a request for suspending transmission of the desktop image to all the computers not in the first display state, so as to allow the one computer in the first display state to increase the transmission resolution and bit rate in accordance with the request information, while allowing all the computers not in the first display state to suspend the transmission of their desktop images.

Another embodiment of the present disclosure also provides a system for wireless screen transmission, which is capable of conveniently displaying a certain split screen among multi-split screens in full-screen, thereby improving interaction experience.

The system for wireless screen transmission in accordance with the embodiment of the present disclosure includes:

a detecting module, to detect whether itself is in a first display state, and transmit the detection result to a receiving terminal, where the first display state refers to that a change in the desktop image is detected within a first preset time period, where the receiving terminal performs wireless screen transmission simultaneously with multiple computers, and the desktop image of the each computer images of the each computer are respectively displayed on corresponding split screens of the receiving terminal; and a transmitting module, to transmit first feedback information to the receiving terminal when detecting itself in the first display state, so that the receiving terminal, responsive to determining that, according to the first feedback information, that only one computer of the multiple computers is in the first display state, displays a split screen corresponding to the one computer in the first display state in full-screen.

Additional aspects and advantages of the present disclosure will be partly provided in the following description, partly become obvious therefrom, or be known through embodiments of the present disclosure.

BRIEF DESCRIPTION OF THE DRAWINGS

The above and/or additional aspects and advantages of embodiments of the present disclosure will become apparent and easy to understand from the following description of the embodiments in conjunction with the figures, where.

DESCRIPTION OF EMBODIMENTS

In order to make the purpose, technical solutions and advantages of embodiments of the present disclosure clearer, the technical solutions in the embodiments of the present disclosure will be described clearly and completely as follows in conjunction with drawings accompanying the embodiments of the present disclosure. And apparently, the described embodiments are just part rather than all of the embodiments of the present disclosure. All the other embodiments acquired by one with ordinary skill in the art based on the embodiments of the present disclosure without making creative efforts shall fall into the protection scope claimed by the present disclosure.

Figure 1:
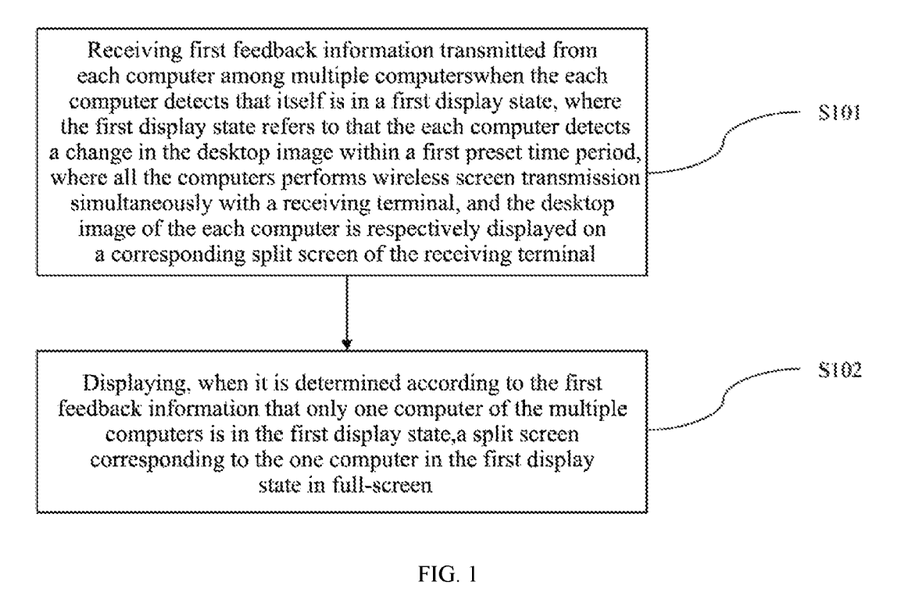
FIG. 1 is a flowchart of a method for wireless screen transmission in accordance with a first embodiment of the present disclosure.

Referring to FIG. 1, the method for wireless screen transmission provided in the first embodiment of the present disclosure is applied to a receiving terminal and at least two computers simultaneously performing wireless screen transmission with the receiving terminal. In this embodiment, descriptions are made by taking an example where the receiving terminal is a flat panel-for-conference, where corresponding screen transition software applications are installed in all computers and the flat panel-for-conference, while all the computers and the flat panel-for-conference are in the same wireless network and capable of performing conventional wireless screen transmission, and the desktop image of the each computer is respectively displayed on a corresponding split screen of the receiving terminal. The method for wireless screen transmission provided in the embodiment at least includes the following steps:

S101, receiving first feedback information transmitted from each computer among multiple computers when the each computer detects that itself is in a first display state, where the first display state refers to that the each computer detects a change in the desktop image within a first preset time period, where all the computers perform wireless screen transmission simultaneously with a receiving terminal, and the desktop image of the each computer is respectively displayed on a corresponding split screen of the receiving terminal;

where the first feedback information may be a message generated when the computer within the first preset time period detects a switch of a front-most desktop window among the collection of windows; where the collection of windows refers to all windows whose sizes are larger than one third of the desktop and which are acquired by the computer after the computer enumerates desktop windows on the desktop through an API in an operating system; where when there are multiple desktop windows on the desktop of a certain computer, the computer firstly enumerates all desktop windows, for instance, the enumerated desktop windows including the paint, the word document, the code editor, the top toolbar, and then finds a current desktop window whose size is larger than one third of the desktop and which is at the front-most position of the desktop. For example, the windows whose sizes are larger than one third of the desktop include the paint, the word document, the code editor; and the window with a window size larger than one third of the desktop is the top toolbar, and among the windows whose sizes are larger than one third of the desktop, when the current desktop window located at the front-most position of the desktop is the paint, the computer determines whether the paint is to be switched to another window. If it is, for example, switched from the paint to the word document, then the computer determines that itself is in the first display state. It may be appreciated that, in other cases of the above method, for example, in practical operations, a user merely operates the top toolbar, which will lead to the determination that itself is not in the first display state. The first preset time period may be 10 seconds, i.e., the first display state may refer to that the computer detects a switch of a desktop window within 10 seconds, at which point the computer generates first feedback information, and transmits the generated first feedback information to the flat panel-for-conference.

In addition, the first feedback information may also refer to a message generated when the computer detects, within the first preset time period, a change in a window layout of the front-most desktop window among a collection of windows. In specific implementation, the computer may monitor a change in the desktop contents by monitoring information of a graphic card, and in doing so, the computer enumerates desktop windows on the desktop through an API in an operating system; then detects whether there is a change in the window layout of the front-most desktop window in the collection of windows, where the window layout may be a distribution of the windows in terms of "order and size". Since the change in the contents on the desktop of the computer does not necessarily represent a change to program contents to be displayed, some indicative information (for instance, QQ message alerts) may also lead to a change in the desktop contents, which, however, is not the situation where the user expects to display in full-screen, and the above method is just provided to avoid such a case. The computer monitors whether there is a change in the desktop contents by monitoring the information of the graphic card, and if this is the case, enumerates the desktop windows on the desktop through an API in an operating system, for example, the enumerated desktop windows include the paint, the word document, the code editor, the top toolbar, and then finds the current desktop window located at the front-most position of the desktop and with a size larger than one third of the desktop as a display window, then detects whether there is a change in the layout above the displayed window, for example, in a case where the displayed window is the paint, at this point a QQ message alert appears on the computer, since the QQ message alert leads to a change in the window layout above the paint, thus demonstrating that the change in the desktop contents monitored by the computer through monitoring the information of the graphic card results from the QQ message alert. Consequently, the computer will not determine that itself is in the first display state; on the contrary, the computer determines itself in the first display state only when a change in the desktop contents is monitored by the computer through monitoring the information of the graphic card, while no change occurs to the window layout above the paint.

S102, displaying, when it is determined according to the first feedback information that only one computer of the multiple computers is in the first display state, a split screen corresponding to the one computer in the first display state in full-screen.

Where once the first feedback information is generated by a computer, the generated first feedback information is transmitted to the flat panel-for-conference, which performs counting in accordance with the detection results, and obtains the number of computers in the first display state.

Where the step of displaying a split screen corresponding to the one computer in the first display state in full-screen may be specifically implemented through the following steps:

transmitting request information to the one computer in the first display state, where the request information includes a request for increasing a transmission resolution and a bit rate, and meanwhile, transmitting a request for suspending transmission of the desktop image to all the computers not in the first display state, so as to allow the one computer in the first display state to increase the transmission resolution and the bit rate in accordance with the request information, while allowing all the computers not in the first display state to suspend the transmission of their desktop images.

In the method for wireless screen transmission according to the embodiments of the present disclosure, each computer determines whether itself is in a first display state, e.g., in the case where only one computer detects itself in the first display state, demonstrating that the user currently operating this computer hopes to draw attention of other people to the contents displayed on his own computer, at this time, since this computer is in the first display state, the receiving terminal would display the split screen corresponding to this computer in full-screen, thus realizing automatic full-screen display of the split screen among multi-split screens, while avoiding complex operation and improving interaction experience.

In addition, as one specific example, the method for wireless screen transmission provided by this embodiment also includes:

keeping displaying the desktop images of all the computers on the split screens when none or at least two of the computers are determined to be in the first display state in accordance with the first feedback information.

Figure 2:
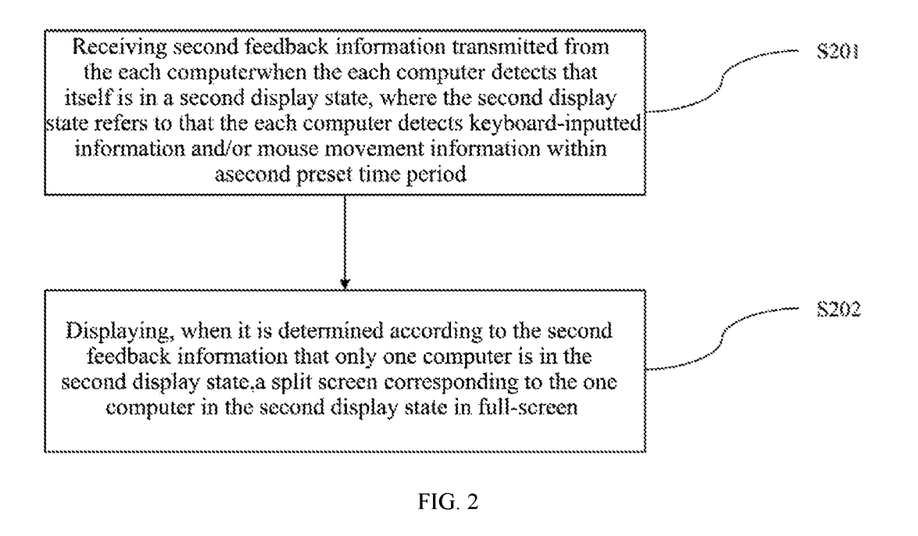
FIG. 2 is a flowchart of a method for wireless screen transmission in accordance with a second embodiment of the present disclosure.

Referring to FIG. 2, the method for wireless screen transmission provided in the second embodiment of the present disclosure is applied to a receiving terminal and at least two computers simultaneously performing wireless screen transmission with the receiving terminal. In this embodiment, descriptions are made by taking an example where the receiving terminal is a flat panel-for-conference, where corresponding screen transition software applications are installed in all computers and the flat panel-for-conference, while all the computers and the flat panel-for-conference are in the same wireless network, and capable of performing conventional wireless screen transmission in the prior art, and the desktop image of the each computer is respectively displayed on a corresponding split screen of the receiving terminal. The method for wireless screen transmission provided in this embodiment at least includes the following steps:

S201, receiving second feedback information transmitted from the each computer when the each computer detects that itself is in a second display state, where the second display state refers to that the each computer detects keyboard-inputted information and/or mouse movement information within a second preset time period.

Where the second preset time period may also be 10 seconds, i.e., the second display state may refer to that the computer detects the keyboard-inputted information and/or mouse movement information within 10 seconds, at which point this computer generates the second feedback information, and transmits the generated second feedback information to the flat panel-for-conference.

S202, displaying, when it is determined according to the second feedback information that only one computer is in the second display state, a split screen corresponding to the one computer in the second display state in full-screen.

Where once the second feedback information is generated by a computer, the generated second feedback information is transmitted to the flat panel-for-conference, which performs counting in accordance with the detection results, and obtains the number of computers in the second display state.

Where the step of displaying the split screen corresponding to one computer in the second display state in full-screen specifically may be implemented through the following steps:

transmitting request information to the computer in the second display state, where the request information includes a request for increasing a transmission resolution and a bit rate, meanwhile, transmitting a request for suspending transmission of the desktop image to all the computers not in the second display state, so as to allow the computer in the second display state to increase the transmission resolution and the bit rate in accordance with the request information, while allowing all the computers not in the second display state to suspend the transmission of their desktop images.

In the method for wireless screen transmission according to this embodiment, each computer determines whether itself is in a second display state, and in the case where only one computer detects the keyboard-inputted information and/or mouse movement information, demonstrating that the user currently operating this computer hopes to draw attention of other people to the contents displayed on his own computer, at this time, since this computer is in the second display state, the receiving terminal would display the split screen corresponding to this computer in full-screen, thus realizing automatic full-screen display of the split screen among multi-split screens, while avoiding complex operation and improving interaction experience.

In addition, as one specific example, the method for wireless screen transmission provided in this embodiment also includes:

keeping displaying the desktop images of all the computers on the split screens when none or at least two of the computers are determined to be in the second display state in accordance with the second feedback information.

Figure 3:
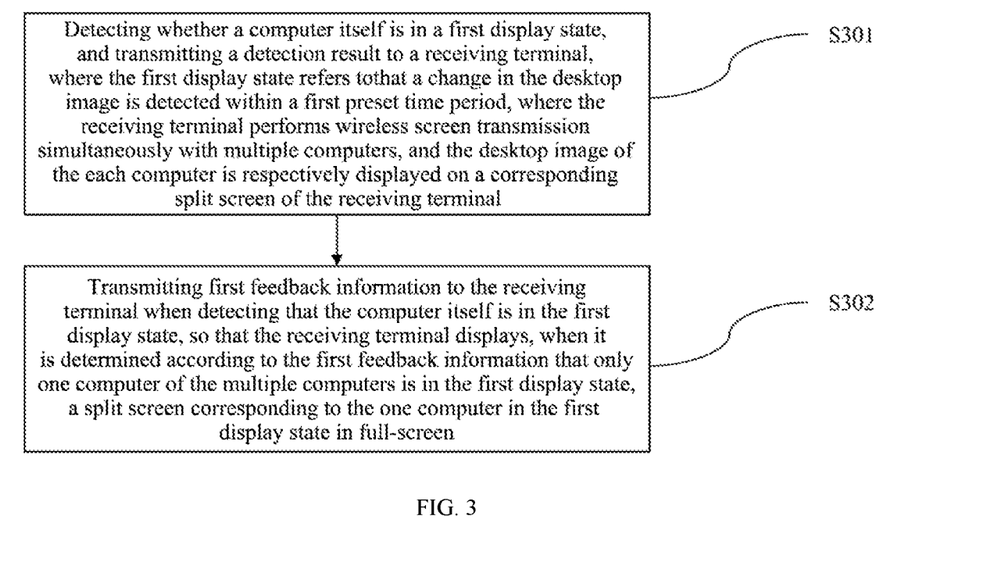
FIG. 3 is a flowchart of a method for wireless screen transmission in accordance with a third embodiment of the present disclosure.

Referring to FIG. 3, the method for wireless screen transmission provided in the third embodiment of the present disclosure is mainly applied to a computer, where multiple computers simultaneously perform wireless screen transmission with one receiving terminal. In this embodiment, descriptions are made by taking an example where the receiving terminal is a flat panel-for-conference, where corresponding screen transition software applications are installed in all computers and the flat panel-for-conference, while all the computers and the flat panel-for-conference are in the same wireless network, capable of performing conventional wireless screen transmission in the prior art, and the desktop image of the each computer is respectively displayed on a corresponding split screen of the receiving terminal. The method for wireless screen transmission provided in this embodiment at least includes the following steps:

S301, detecting whether a computer itself is in a first display state, and transmitting a detection result to a receiving terminal, where the first display state refers to that a change in the desktop image is detected within a first preset time period, where the receiving terminal performs wireless screen transmission simultaneously with multiple computers, and the desktop image of the each computer is respectively displayed on a corresponding split screen of the receiving terminal; and S302, transmitting first feedback information to the receiving terminal when detecting that the computer itself is in the first display state, so that the receiving terminal displays, when it is determined according to the first feedback information that only one computer of the multiple computers is in the first display state, a split screen corresponding to the one computer in the first display state in full-screen.

In addition, in this embodiment, after the step of transmitting first feedback information to the receiving terminal when detecting itself in the first display state, the method includes:

receiving request information transmitted from the receiving terminal, where the request information includes a request for increasing a transmission resolution and a bit rate, meanwhile, receiving a request for suspending transmission of the desktop image transmitted by the receiving terminal, so as to allow the one computer in the first display state to increase the transmission resolution and the bit rate in accordance with the request information, while allowing all computers among the multiple computers not in the first display state to suspend the transmission of their desktop images.

In this embodiment, the first feedback information is a message generated when the computer detects, within the first preset time period, a switch of a front-most desktop window in a collection of windows or a change in a window layout; where the collection of windows refers to all windows whose sizes are larger than one third of the desktop and which are acquired by the computer after the computer enumerates desktop windows on the desktop through an API in an operating system.

In addition, the method in this embodiment further includes:

detecting whether a computer itself is in a second display state, and transmitting a detection result to a receiving terminal, where the second display state refers to that the each computer detects, within a second preset time period, keyboard-inputted information and/or mouse movement information;

transmitting second feedback information to the receiving terminal when detecting that the computer itself is in the second display state, so that the receiving terminal displays, when it is determined according to the second feedback information that only one computer is in the second display state, a split screen corresponding to the one computer in the second display state in full-screen.

Figure 4:
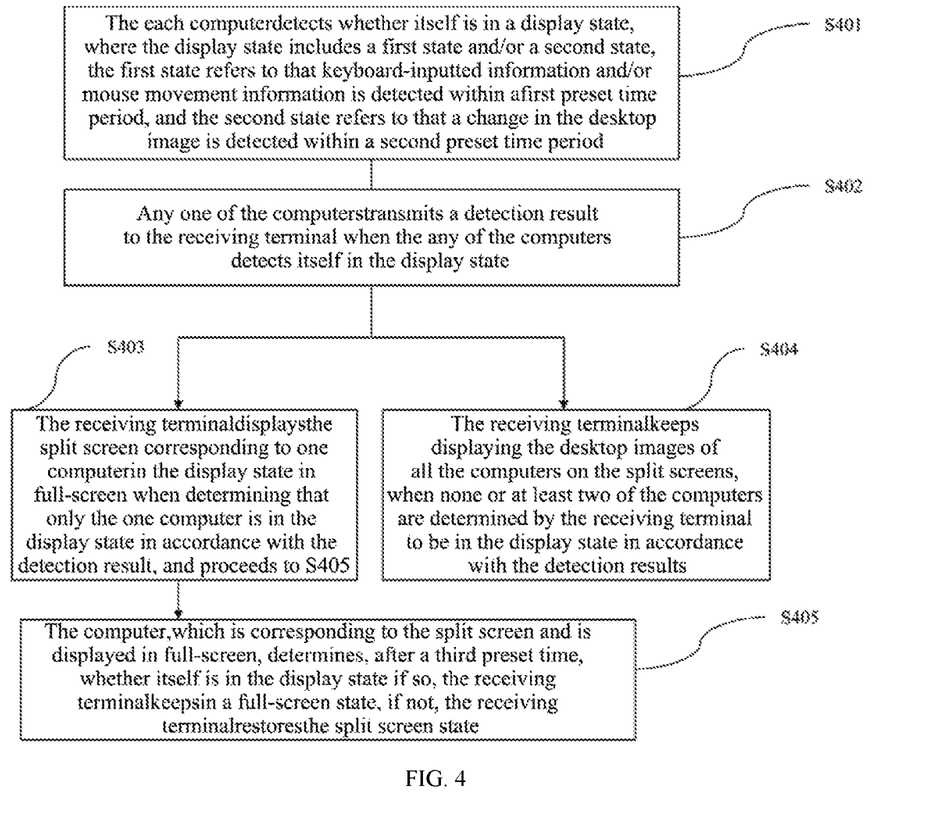
FIG. 4 is a flowchart of a method for wireless screen transmission in accordance with a fourth embodiment of the present disclosure.

In addition, the method in this embodiment further includes:

transmitting first feedback information to the receiving terminal when detecting itself in the first display state, so as to keep displaying the desktop images of all the computers on the split screens when none or at least two of the computers are determined to be in the first display state by the receiving terminal in accordance with the first feedback information. Referring to FIG. 4, the method for wireless screen transmission provided in the fourth embodiment is applied to a receiving terminal and at least two computers simultaneously performing wireless screen transmission with the receiving terminal. In this embodiment, descriptions are made by taking an example where the receiving terminal is a flat panel-for-conference, where corresponding screen transition software applications are installed in all the computers and the flat panel-for-conference, while all the computers and the flat panel-for-conference are in the same wireless network, capable of performing conventional wireless screen transmission in the prior art, and the desktop image of the each computer is respectively displayed on a corresponding split screen of the receiving terminal. The method for wireless screen transmission provided in this embodiment at least includes the following steps:

S401, the each computer detects whether itself is in a display state, where the display state includes a first state and/or a second state, the first state refers to that keyboard-inputted information and/or mouse movement information is detected within a first preset time period, and the second state refers to that a change in the desktop image is detected within a second preset time period;

S402, any one of the computers transmits a detection result to the receiving terminal when the any of the computers detects itself in the display state;

S403, the receiving terminal displays the split screen corresponding to one computer in the display state in full-screen when determining that only the one computer is in the display state in accordance with the detection result, and proceeds to S405;

S404, the receiving terminal keeps displaying the desktop images of all the computers on the split screens, when none or at least two of the computers are determined by the receiving terminal to be in the display state in accordance with the detection results;

S405, the computer, which is corresponding to the split screen being displayed in full-screen, determines, after a third preset time, whether itself is in the full-screen display state if so, the receiving terminal keeps in a full-screen state, if not, the receiving terminal restores the split screen state.

Where descriptions are made by taking an example where the third preset time is 30 seconds, after the split screen corresponding to one computer is displayed in full-screen on the flat panel-for-conference, this computer proceeds to determine whether itself is in the display state after 30 seconds, if so, the flat panel-for-conference keeps displaying the split screen corresponding to this computer in full-screen, if not, the flat panel-for-conference restores a screen transition state with split screens.

One specific application scenario is provided as follows: in a conference, four designers respectively project design drafts from their own laptops onto a large flat panel-for-conference in a conference room for comparative presentation in the form of four split screens, and some design details are to be demonstrated during discussion. Designer A uses a mouse to indicate details calling for attention of the participants in the conference or to revise contents in the currently presented ppt. The computer of Designer A determines whether itself is in a display state in accordance with the above method, whereas the other computers determine themselves to be in a non-display state, and the large flat panel-for-conference determines that only one computer is in the display state upon counting, therefore, the large flat panel-for-conference automatically displays the computer screen of Designer A in full-screen. At the time point which is 30 seconds after Designer A completes his presentation, Designer A no longer performs any operation, the large flat panel-for-conference automatically restores comparative presentation in four split screens. It may be understood that, operations simultaneously performed by multiple designers to the design drafts would not trigger full-screen display of a certain split screen.

Figure 5:
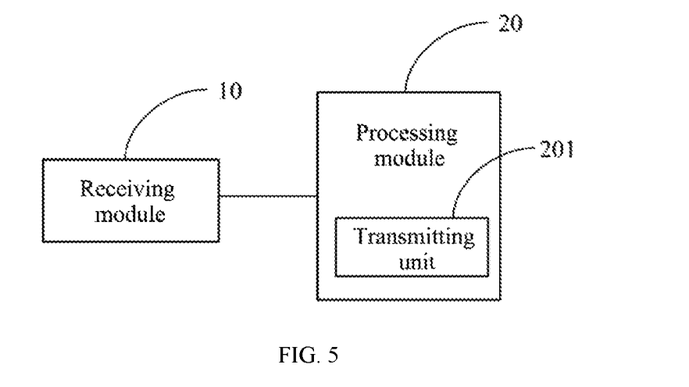
FIG. 5 is a structural diagram of a system for wireless screen transmission in accordance with a fifth embodiment of the present disclosure.

Referring to FIG. 5, based on the same disclosure conception, the system for wireless screen transmission provided by a fifth embodiment of the present disclosure includes:

a receiving module 10, to receive first feedback information transmitted from each computer among multiple computers when the each computer detects that itself is in a first display state, where the first display state refers to that the each computer detects a change in the desktop image within a first preset time period, where all of the multiple computers simultaneously perform wireless screen transmission with a receiving terminal, and the desktop image of the each computer is respectively displayed on a corresponding split screen of the receiving terminal; and a processing module 20, to display, when it is determined according to the first feedback information that only one computer of the multiple computers is in the first display state, a split screen corresponding to the one computer in the first display state in full-screen.

In this embodiment, the processing module 20 includes:

a transmitting unit 201, to transmit request information to the computer in the first display state, where the request information includes a request for increasing a transmission resolution and a bit rate, meanwhile, transmit a request for suspending transmission of the desktop image to all computers among the multiple computers not in the first display state, so as to allow the one computer in the first display state to increase the transmission resolution and the bit rate in accordance with the request information, while allowing all the computers not in the first display state to suspend the transmission of their desktop images.

In this embodiment, the first feedback information is a message generated when the computer within the first preset time period detects a switch of a front-most desktop window in a collection of windows or a change in a window layout; where the collection of windows refers to all windows whose sizes are larger than one third of the desktop and which are acquired by the computer after the computer enumerates desktop windows on the desktop through an API in an operating system.

In this embodiment, the receiving module 10 is also to receive second feedback information transmitted from the each computer when the each computer detects that itself is in a second display state, where the second display state refers to that the each computer detects keyboard-inputted information and/or mouse movement information within a second preset time period;

the processing module 20 is also to display, when it is determined according to the second feedback information that only one computer is in the second display state, a split screen corresponding to the one computer in the second display state in full-screen.

In this embodiment, the processing module 20 is also to keep displaying the desktop images of all the computers on the split screens when none or at least two of the computers are determined to be in the first display state in accordance with the first feedback information.

The technical features and technical effects of the system for wireless screen transmission provided in the embodiment of the present disclosure is the same as those in the method provided therein, and will not be repeated herein.

Figure 6:
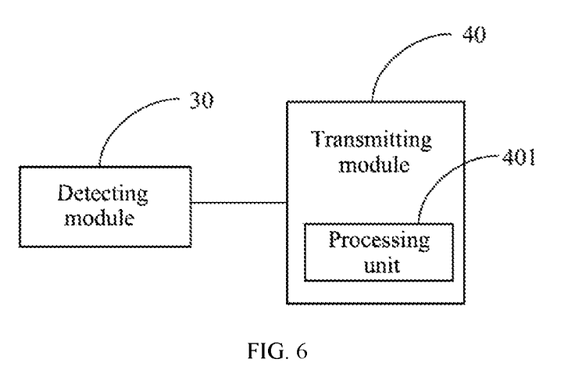
FIG. 6 is a structural diagram of a system for wireless screen transmission in accordance with a sixth embodiment of the present disclosure.

Referring to FIG. 6, based on the same disclosure conception, a sixth embodiment of the present disclosure also provides a system for wireless screen transmission, including:

a detecting module 30, to detect whether itself is in a first display state, and transmit a detection result to a receiving terminal, where the first display state refers to that a change in the desktop image is detected within a first preset time period, where the receiving terminal performs wireless screen transmission simultaneously with multiple computers, and the desktop image of the each computer is respectively displayed on a corresponding split screen of the receiving terminal; and a transmitting module 40, to transmit first feedback information to the receiving terminal when detecting itself in the first display state, so that the receiving terminal displays, when it is determined according to the first feedback information that only one computer of the multiple computers is in the first display state, a split screen corresponding to the one computer in the first display state in full-screen.

In this embodiment, the transmitting module 40 includes:

a processing unit 401, to receive request information transmitted from the receiving terminal, where the request information includes a request for increasing a transmission resolution and a bit rate, meanwhile, receive a request for suspending transmission of the desktop image transmitted by the receiving terminal, so as to allow the one computer in the first display state to increase the transmission resolution and the bit rate in accordance with the request information, while allowing all the computers not in the first display state to suspend the transmission of their desktop images.

In this embodiment, the first feedback information is a message generated when the computer within the first preset time period detects a switch of a front-most desktop window in a collection of windows or a change in a window layout; where the collection of windows refers to all windows whose sizes are larger than one third of the desktop and which are acquired by the computer after the computer enumerates desktop windows on the desktop through an API in an operating system.

In this embodiment, the detecting module 30 is also to detect whether itself is in a second display state, and transmit the detection result to the receiving terminal, where the second display state refers to that the each computer detects, within a second preset time period, keyboard-inputted information and/or mouse movement information;

The transmitting module 40 is also to transmit second feedback information to the receiving terminal when detecting itself in the second display state, so that the receiving terminal displays a split screen corresponding to one computer in the second display state in full-screen, when only the one computers is determined to be in the second display state in accordance with the second feedback information.

In this embodiment, the transmitting module 40 is also to transmit the first feedback information to the receiving terminal when detecting itself in the first display state, so that the receiving terminal keeps displaying the desktop images of all the computers on the split screens when none or at least two of the computers are determined to be in the first display state in accordance with the first feedback information. Logics and/or steps illustrated in the flowcharts or described herein in other manners, for example, may be regarded as an ordered list of executable instructions for realizing a logic function, and may be specifically implemented in any computer readable medium, for use by the instruction executing systems, apparatuses or devices (for example, computer-based systems, systems including a processor, or other systems that are capable of accessing instructions from instruction executing systems, apparatuses or devices and executing the instructions), or for use in conjunction with these instruction executing systems, apparatuses or devices. As to the present specification, the "computer readable medium" may be any apparatus which may include, store, communicate, propagate or transmit programs for use by instruction executing systems, apparatuses or devices, or for use in conjunction with the instruction executing systems, apparatuses or devices.

More specific examples (a non-exhaustive list) of the computer readable medium include: an electric connection section (electronic apparatus) with one or more wirings, a portable computer disk cartridge (magnetic apparatus), a random access memory (RAM), a read-only memory (ROM), an erasable programmable read-only-memory (EPROM or flash memory), an optical fiber apparatus, and a portable compact disc read-only memory (CDROM). In addition, the computer readable medium may even be a paper or other proper medium on which the program may be printed, because the program may be obtained in an electronic manner, for example, by optically scanning paper or other media, followed by editing, interpretation or by processing in other proper manners, if necessary, then by storing in a computer memory.

It should be understood that, the parts of the present disclosure may be realized through hardware, software, firmware or a combination thereof. In the above implementations, multiple steps or methods may be implemented using software or firmware stored in a memory and executed by a proper instruction executing system. For example, if hardware is employed for the implementation as in another implementation, any of the following known technologies in the prior art or a combination thereof may be used in implementation: a discrete logic circuit with a logical gating circuit for implementing a logic function of data signals, and an application specific integrated circuit with a proper combined logical gating circuits, a programmable gate array (PGA), as well as a field programmable gate array (FPGA) and the like.

In the description of the present specification, description concerning the reference terms "one embodiment", "some embodiments", "example", "specific example", or "some examples" means that the specific feature, structure, material or feature described in conjunction with the embodiments or examples is included in at least one embodiment or example of the present disclosure. In the present specification, the schematic expression of the above terms does not necessarily refer to the same embodiment or example. Moreover, the described specific feature, structure, material or feature may be combined in any one or multiple embodiments or examples in a proper manner.

Although the embodiments of the present disclosure have been illustrated and described, those skilled in the art may understand that various changes, modifications, substitutions and variations may be made to these embodiments without departing from the principle and purpose of the present disclosure, and the scope of the present disclosure may be defined by the claims and equivalents thereof.

The invention claimed is:

1. A system for wireless screen transmission, comprising:
a receiving module, to receive first feedback information transmitted from each computer among a plurality of computers when the each computer detects that itself is in a first display state, wherein the first display state refers to that the each computer detects a change of a desktop image within a first preset time period, wherein all of the a plurality of computers simultaneously perform wireless screen transmission with a receiving terminal, and the desktop image of the each computer is respectively displayed on a corresponding split screen of the receiving terminal; and
a processing module, to responsive to determining that, according to the first feedback information, only one computer of the a plurality of computers is in the first display state, display content of a split screen corresponding to the only one computer in the first display state in a full-screen.

2. The system for wireless screen transmission according to claim 1, wherein the processing module comprises:
a transmitting unit, to transmit request information to the only one computer in the first display state, wherein the request information comprises a request for increasing at least one of a transmission resolution or a bit rate, and transmit a request for suspending transmission of the desktop image to all of the other computers among the plurality of computers not in the first display state, so as to allow the only one computer in the first display state to increase at least one of the transmission resolution or the bit rate in accordance with the request information, while allowing all of the other computers not in the first display state to suspend the transmission of their desktop images.

3. A system for wireless screen transmission, comprising:
a detecting module, to detect whether a computer itself is in a first display state, and transmit a detection result to a receiving terminal, wherein the first display state refers to that a change of a desktop image is detected within a first preset time period, wherein the receiving terminal is to perform wireless screen transmission simultaneously with a plurality of computers, and the desktop image of the each computer is respectively displayed on a corresponding split screen of the receiving terminal; and
a transmitting module, to transmit first feedback information to the receiving terminal responsive to detecting the computer itself in the first display state, so that the receiving terminal responsive to determining that, according to the first feedback information, only one computer of the multiple computers is in the first display state, is to display a split screen corresponding to the only one computer in the first display state in a full-screen.

4. A method for wireless screen transmission, comprising:
receiving first feedback information transmitted from each computer among a plurality of computers when the each computer detects that itself is in a first display state, wherein the first display state refers to that the computer detects a change of a desktop image within a first preset time period, wherein all of the plurality of computers simultaneously perform wireless screen transmission with a receiving terminal, and the desktop image of the each computer is respectively displayed on a corresponding split screen of the receiving terminal; and
responsive to determining that, according to the first feedback information, only one computer of the plurality of computers is in the first display state, displaying content of a split screen corresponding to the only one computer in the first display state in a full-screen.

5. The method for wireless screen transmission according to claim 4, wherein displaying content of a split screen corresponding to the only one computer in the first display state in a full-screen further comprises:
transmitting request information to the only one computer in the first display state, wherein the request information comprises a request for increasing at least one of a transmission resolution or a bit rate; and
transmitting a request for suspending transmission of the desktop image to all of the other computers among the multiple plurality of computers that are not in the first display state, so as to allow the only one computer in the first display state to increase at least one of the transmission resolution or the bit rate in accordance with the request information, while allowing all of the other computers not in the first display state to suspend the transmission of their desktop images.

6. The method for wireless screen transmission according to claim 4,
wherein the first feedback information is a message generated when the each computer detects, within the first preset time period, a switch of a front-most desktop window in a collection of windows or a change in a window layout; wherein the collection of windows refers to all windows whose sizes are at least one third of a desktop screen and which are acquired by the each computer after the each computer enumerates desktop windows on the desktop screen through an application program interface (API) in an operating system.

7. The method for wireless screen transmission according to claim 4, further comprising
receiving second feedback information transmitted from the each computer when the each computer detects that itself is in a second display state, wherein the second display state refers to that the each computer detects at least one of keyboard-inputted information or mouse movement information within a second preset time period;
responsive to determining that, according to the second feedback information, only one computer is in the second display state, displaying a split screen corresponding to the only one computer in the second display state in a full-screen.

8. The method for wireless screen transmission according to claim 4, further comprising:
keeping displaying the desktop images of all the computers on the split screens when none or at least two of the computers are determined to be in the first display state in accordance with the first feedback information.

9. A method for wireless screen transmission, the method comprising:
detecting, by a computer, whether the computer itself is in a first display state, and transmitting a detection result to a receiving terminal, wherein the first display state refers to that a change of a desktop image is detected within a first preset time period, wherein the receiving terminal is to perform wireless screen transmission simultaneously with a plurality of computers, and the desktop image of the each computer is respectively displayed on a corresponding split screen of the receiving terminal; and
transmitting first feedback information to the receiving terminal responsive to detecting that the computer itself is in the first display state, so that when the receiving terminal determines only one computer is in the first display state in accordance with the first feedback information, the receiving terminal is to display content of a split screen corresponding to the only one computer in the first display state in a full-screen.

10. The method for wireless screen transmission according to claim 9, wherein, responsive to transmitting first feedback information to the receiving terminal responsive to detecting that the computer itself is in the first display state, the method comprises;
receiving request information transmitted from the receiving terminal, wherein the request information comprises a request for increasing at least one of a transmission resolution or a bit rate; and
receiving a request for suspending transmission of the desktop image transmitted by the receiving terminal, so as to allow the one only computer in the first display state to increase at least one of the transmission resolution or the bit rate in accordance with the request information, while allowing all of the other computers among the plurality of computers not in the first display state to suspend the transmission of their desktop images.

\* \* \* \* \*